Patented Aug. 10, 1926.

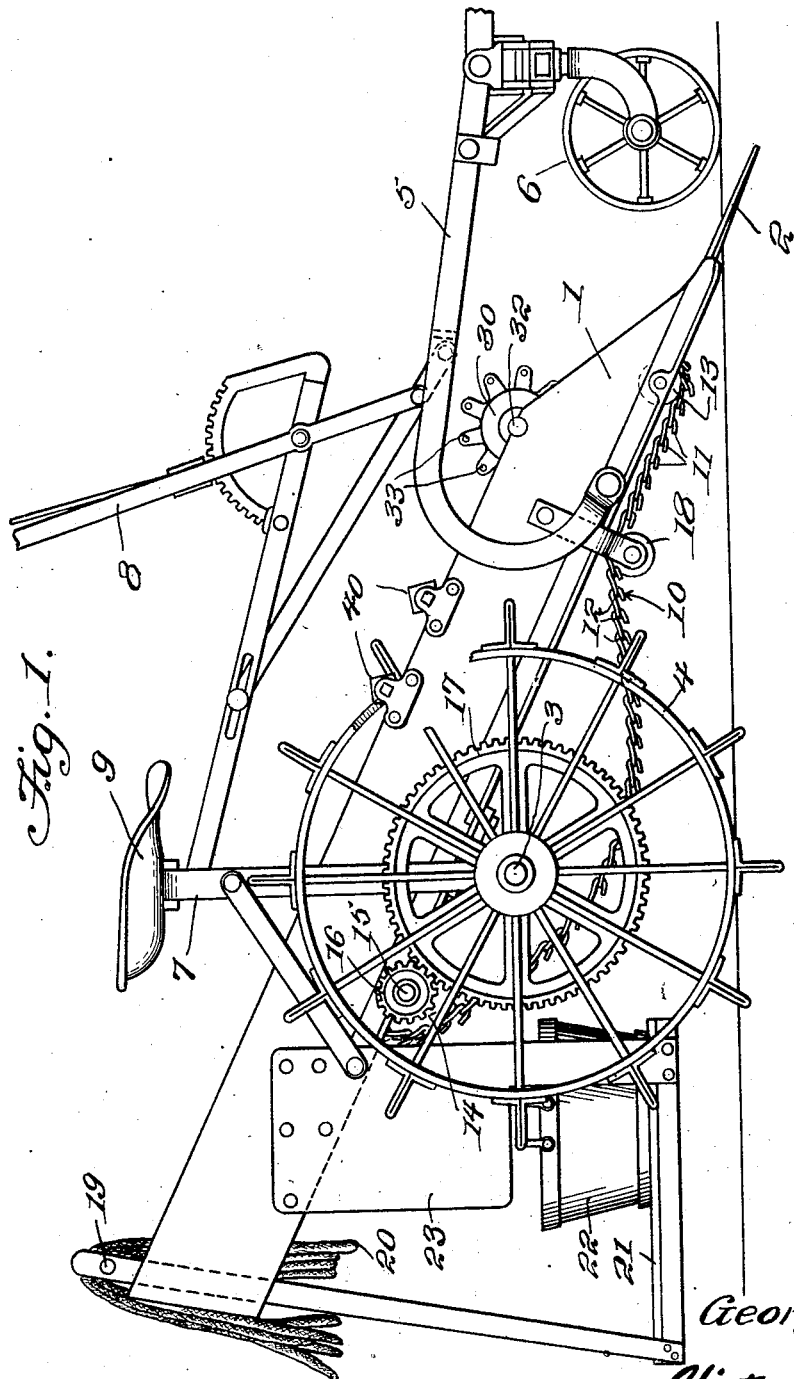

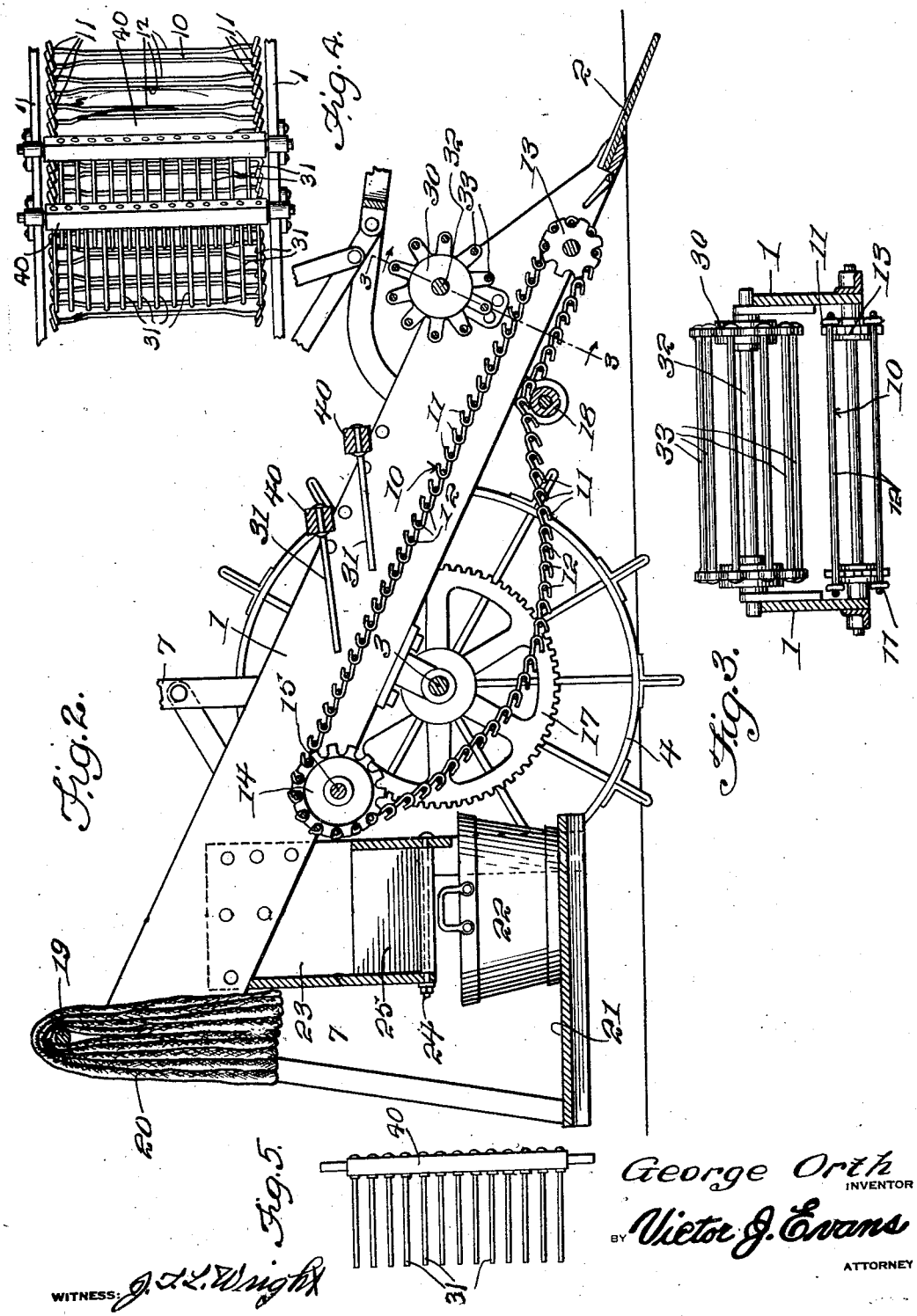

1,595,217

UNITED STATES PATENT OFFICE.

GEORGE ORTH, OF RIVERHEAD, NEW YORK.

POTATO HARVESTER.

Application filed December 15, 1924. Serial No. 756,085.

My present invention pertains to means for harvesting potatoes, and it has for one of its objects the provision of a potato harvester adapted to carry receptacles for the reception of potatoes, and equipped with efficient means for freeing potatoes from clods of dirt en route between the ground and the said receptacles.

To the attainment of the foregoing, the invention consists in the improvement as hereinafter described and definitely claimed.

In the accompanying drawings, forming part of this specification:—

Figure 1 is a side elevation of the potato harvester constituting the preferred embodiment of my invention.

Figure 2 is a longitudinal vertical section of the same.

Figure 3 is a transverse section taken in the plane indicated by the line 3—3 of Figure 2.

Figure 4 is a fragmentary plan view illustrative of the resilient fingers for clearing dirt from the potatoes incident to the upward and rearward passage of the potatoes in the harvester.

Figure 5 is a detail plan view of one of said sets of fingers.

Similar numerals of reference designate corresponding parts in all of the views of the drawings.

Among other elements my novel potato harvester comprises an appropriate main frame 1 equipped at its forward and lower end with a plow 2. The said main frame 1 is supported by an axle 3 on which are ground wheels 4, and it will be noted that the forward portion of the main frame 1 is equipped with a forwardly extending beam 5 supported by a ground wheel 6 and connected with the main frame 1 and a seat support 7 in such manner that the position of the plow 2 may be nicely regulated by adjusting and adjustably fixing a hand lever 8 arranged in convenient proximity to a driver seat 9.

Carried by the frame 1 is an endless conveyor 10 preferably made up of links 11 and transverse rods 12. The said links 11 serve to form side chains, and the said side chains are supported by forward idler sprockets 13 and rear guard sprockets 14, the sprockets 14 being fixed to a transverse shaft 15. Also fixed to the shaft 15 are spur gears 16 which are meshed with comparatively large spur gears 17 fixed with respect to the ground wheels 4. From this it follows that when the harvester is in motion the ground wheels 4 will drive the conveyor 10 so that the upper stretch of the said conveyor moves upwardly and rearwardly. Appropriate means on the frame 1 is provided at 18 for the support of the lower stretch of the endless conveyor.

Carried by the rear portion of the main frame 1 is a transverse rod 19 on which removable bags 20 may be suspended after the manner shown in Figures 1 and 2.

Connected to and disposed below the upper rear portion of the main frame 1 is a platform 21 on which baskets 22 or other suitable receptacles are removably superposed as shown in Figures 1 and 2.

Connected to and pendent from the rear portion of the frame 1 is a vertically disposed conduit 23 in the center of the lower portion of which is pivoted at 24 a gate 25, as shown in Figure 2.

It will be gathered from the foregoing that by use of my novel harvester the dug potatoes instead of being deposited on the ground are carried to receptacles 22, and said receptacles are utilized for the filling of the bags 20 with potatoes. From this it follows that it is important that the potatoes be freed of dirt precedent to the delivery of the potatoes to the receptacles 22. Therefore, I provide the cage wheel 30 and the two sets of resilient fingers 31 shown in Figures 2 to 5. The cage wheel 30 is mounted to loosely turn about a center 32 on the main frame 1, and is made up of heads preferably shaped as shown and transverse rods 33, Figure 3 interposed between and carried by the arms of the said heads. The cage wheel 30 is designed and adapted by cooperation with the upper stretch of the endless conveyor and elevator 10 to break clods of dirt from the potatoes, it being understood in this connection that the cage wheel 30 will be rotated by the potatoes and clods of dirt thereon incident to the upward passage of the potatoes and clods of dirt under the wheel 30.

After the breaking of the clods of dirt from the potatoes the sets of resilient fingers 31 shown in the rear of the cage wheel 30 will operate to clear practically all of the dirt from the potatoes, whereupon the dirt will gravitate through the endless conveyor 10 while the potatoes on said conveyor will be carried rearwardly and upwardly and discharge into the before mentioned conduit 23. The resilient fingers 31 are preferably arranged as illustrated in Figure 4 so that the fingers 31 of each set will be alined with the spaces between the fingers 31 of the other set. Each set of the fingers 31 is carried by a head 40, and each of the said heads 40 is held against turning at its ends and on the frame 1, Figures 1, 2 and 4. The free ends of the resilient fingers 31 rest adjacent to the upper stretch of the conveyor 10, and from this it follows that while the said fingers 31 will permit the upward passage of potatoes the fingers 31 may be depended upon to wipe or remove practically all dirt from the potatoes. In virtue of this when the potatoes are discharged into the conduit 23 they will be practically free from dirt.

In the practical use of my novel harvester, the harvester is drawn across a field behind draft animals or behind a tractor, the plow 2 serving incident to the traverse to dig potatoes from the ground, and the conveyor 10 serving to carry the potatoes and dirt thereon upwardly and rearwardly under the cage wheel 30 and under the resilient fingers 31, in the manner and for the purpose before described. From the conveyor 10 the potatoes are caused to pass into the upright conduit 23 in which the potatoes will gravitate and be discharged into one of the receptacles 22. When the receptacle 22 is filled with potatoes, the gate 25 is shifted on its pivot 24 and then said receptacle 22 is removed for the discharge of its potatoes into one of the bags 20.

It will be apparent from the foregoing that my novel harvester provides for the cleaning of the potatoes after the digging thereof and also provides for the convenient sacking of the cleaned potatoes, and this without the necessity of any potatoes being handled by hand.

It will be understood from the foregoing that without affecting my invention, the main frame 1 and its appurtenances may be of any construction compatible with the purpose of my invention.

It will also be understood from the foregoing that the construction illustrated constitutes the preferred embodiment of my invention, but I do not desire to be understood as confining myself to said construction, my invention being defined by my appended claims within which structural changes may be made without departure from my invention.

Having described my invention, what I claim and desire to secure by Letters-Patent, is:—

1. In a potato harvester, the combination of a wheeled frame, a plow carried thereby, an endless conveyor carried by said frame and having a longitudinal inclined upper stretch arranged with its lower portion adjacent to the plow, means for driving said conveyor, a cage wheel mounted to rotate above and in spaced relation to the lower portion of the upper stretch of the conveyor and having spaced transverse rods, and a set of resilient spaced fingers arranged in rear of the said cage wheel and carried by the frame and having the free ends of the fingers arranged adjacent to the upper stretch of the conveyor for the purpose of freeing dirt from the potatoes.

2. In a potato harvester, the combination of a wheeled frame, a plow carried thereby, an endless conveyor carried by said frame and having a longitudinal inclined upper stretch arranged with its lower portion adjacent to the plow, means for driving said conveyor, a cage wheel mounted to rotate above and in spaced relation to the lower portion of the upper stretch of the conveyor and having spaced transverse rods, a transverse series of longitudinal spaced resilient fingers carried by the frame and disposed in rear of the cage wheel and having the free ends of the fingers arranged adjacent to the upper stretch of the conveyor, and a second set of spaced resilient fingers carried by the frame and spaced in rear of the first-named set and with the ends of the fingers adjacent to the upper stretch of the conveyor; the fingers of each set being longitudinally alined with the spaces between the fingers of other set.

In testimony whereof I affix my signature.

GEORGE ORTH.